(12) United States Patent
Pfeil et al.

(10) Patent No.: US 6,191,738 B1
(45) Date of Patent: *Feb. 20, 2001

(54) METHOD AND APPARATUS FOR LOCATING A REMOTE UNIT WITHIN A COMMUNICATION SYSTEM

(75) Inventors: Jeff L. Pfeil, Bartlett; Javier J. Tapia, Wheaton, both of IL (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/409,545

(22) Filed: Sep. 30, 1999

(51) Int. Cl.$^7$ ........................................ G01S 3/02
(52) U.S. Cl. ................................. 342/457; 455/456
(58) Field of Search ........................ 342/457; 455/456

(56) References Cited

U.S. PATENT DOCUMENTS

| | | | |
|---|---|---|---|
| 5,317,323 | * 5/1994 | Kennedy et al. | 342/457 |
| 5,758,288 | * 5/1998 | Dunn et al. | 455/456 |
| 5,890,068 | * 3/1999 | Fattouche et al. | 455/456 |
| 5,945,944 | * 8/1999 | Krasner | 342/357.06 |

\* cited by examiner

*Primary Examiner*—Theodore M. Blum
(74) *Attorney, Agent, or Firm*—Kenneth A. Haas (57) ABSTRACT

Determining a timing offset for remote-unit (113) location is accomplished by comparing a known sequence (203) to the information (201) transmitted by the remote unit (113) and received by the remote site (101, 102). In the preferred embodiment of the present invention a correlation window length (or size of the known sequence (203)) is allowed to vary based on a fundamental geometry of the serving and non-serving base stations, and a distance that the remote unit (113) is from the serving and non-serving base stations (101, 102).

4 Claims, 5 Drawing Sheets

METHOD AND APPARATUS FOR LOCATING A REMOTE UNIT WITHIN A COMMUNICATION SYSTEM

CROSS REFERENCE TO RELATED CO-PENDING APPLICATIONS

This application is a related application to a co-pending application entitled "Method and Apparatus for Locating a Remote Unit Within a Communication System" having inventors Pfeil et al., Ser. No. 09/409,552, filed on Sep. 30, 1999, owned by instant assignee and hereby incorporated in its entirety by reference.

FIELD OF THE INVENTION

The present invention relates generally to communication systems and, in particular, to a method and apparatus for locating a remote unit within a communication system.

BACKGROUND OF THE INVENTION

Radio location techniques have been widely used in many mobile transmitter location systems (e.g., Loran-C). There are three primary methods used to determine the location of a remote unit within a communication system, namely the a) Time of Arrival (TOA), b) Time Difference of Arrival (TDOA) methods, and c) Angle of Arrival (AOA) methods.

TOA Method for Location: When the distances $x_1$ and $x_2$ between a remote unit and a pair of fixed base stations are known, the position of the remote unit may be computed by determining the point of intersection of two circles with radii $x_1$ and $x_2$, each centered at one of the fixed base stations. If an error exists in either or both distance determinations, the true position of the remote unit, P, will be displaced and observed to lie at the intersection P', of the perturbed radial arcs $x_{11}$ and $x_{12}$. A third base station is typically needed to unambiguously locate each remote unit at the unique point of intersection of the three circles. To accurately compute the remote unit location using this method, it is necessary to know precisely the instant the signal is emitted from the base stations and the instant it arrives at the remote unit. For this method to work properly, an accurate measurement of the total time delay along each of three remote unit to base station signal paths is necessary.

TDOA Method for Location: For this method of location, the observed time difference between pairs of signals arriving at the remote unit from three or more base stations are used to compute the location of the remote unit. The remote unit, by observing the time difference in arriving signals between base station pairs, can establish the hyperbolae or "lines of position" (LOPs'). In this method therefore, the location estimate can be obtained without knowledge of the absolute arrival time of the signal from each base station at the remote unit, only time differences in arrival are significant.

AOA Method for Location: AOA location is described in U.S. Pat. No. 4,636,796, RADIO DIRECTION FINDING SYSTEM, by Imazeki and U.S. Pat. No. 4,833,478, AUTOMATIC DIRECTION FINDER ANTENNA ARRAY, by Nossen. According to such a method, the angle of arrival of a signal transmitted from a remote unit is determined by analyzing the amplitude (or phase) differences between multiple antennas at a base site. Antennas in one sector will receive the remote unit's signal at a different angle of arrival than antennas in other sectors. It is the difference in received amplitudes (or phases) of the remote unit's signal at various antennas that is utilized in determining the angle of arrival of the signal. A look-up table may be used to equate the measured amplitude (or phase) difference to an angle of arrival.

TOA and TDOA location methods require intensive processing of multiple base stations to calculate arrival times for a particular remote unit. Although AOA does not require intensive processing of multiple base stations, AOA location techniques are not as accurate as TOA or TDOA methods of location. Therefore, a need exists for a method and apparatus for locating a remote unit within a communication system that is highly accurate, yet does not require the intensive processing as prior-art TOA or TDOA methods of location.

DESCRIPTION OF THE PREFERRED EMBODIMENTS

To address the above-mentioned need a method and apparatus for locating a remote unit is provided herein. In the preferred embodiment of the present invention determining a timing offset for remote-unit location is accomplished by comparing a known sequence to the information transmitted by the remote unit and received by the remote site. In the preferred embodiment of the present invention a correlation window length (or size of the known sequence) is allowed to vary based on a fundamental geometry of the serving and non-serving base stations, and a distance that the remote unit is from the serving and non-serving base stations. By allowing the correlation window to vary based on the distance between the non-serving base stations and the distance/offset under evaluation, significant increases in computational throughput as well as reductions in ASIC/DSP processing requirements are obtained.

The present invention encompasses a method for locating a remote unit within a communication system. The method comprises the steps of determining a distance from a base station to search for the remote unit, determining a size of a correlation window based on the distance from the base station, and locating the remote unit utilizing the correlation window.

The present invention additionally encompasses an apparatus for locating a remote unit. The apparatus comprises a processor outputting a value for a correlation window size based on a location of the remote unit and a searcher having the correlation window size as an input and outputting a correlation power.

Figure 1:
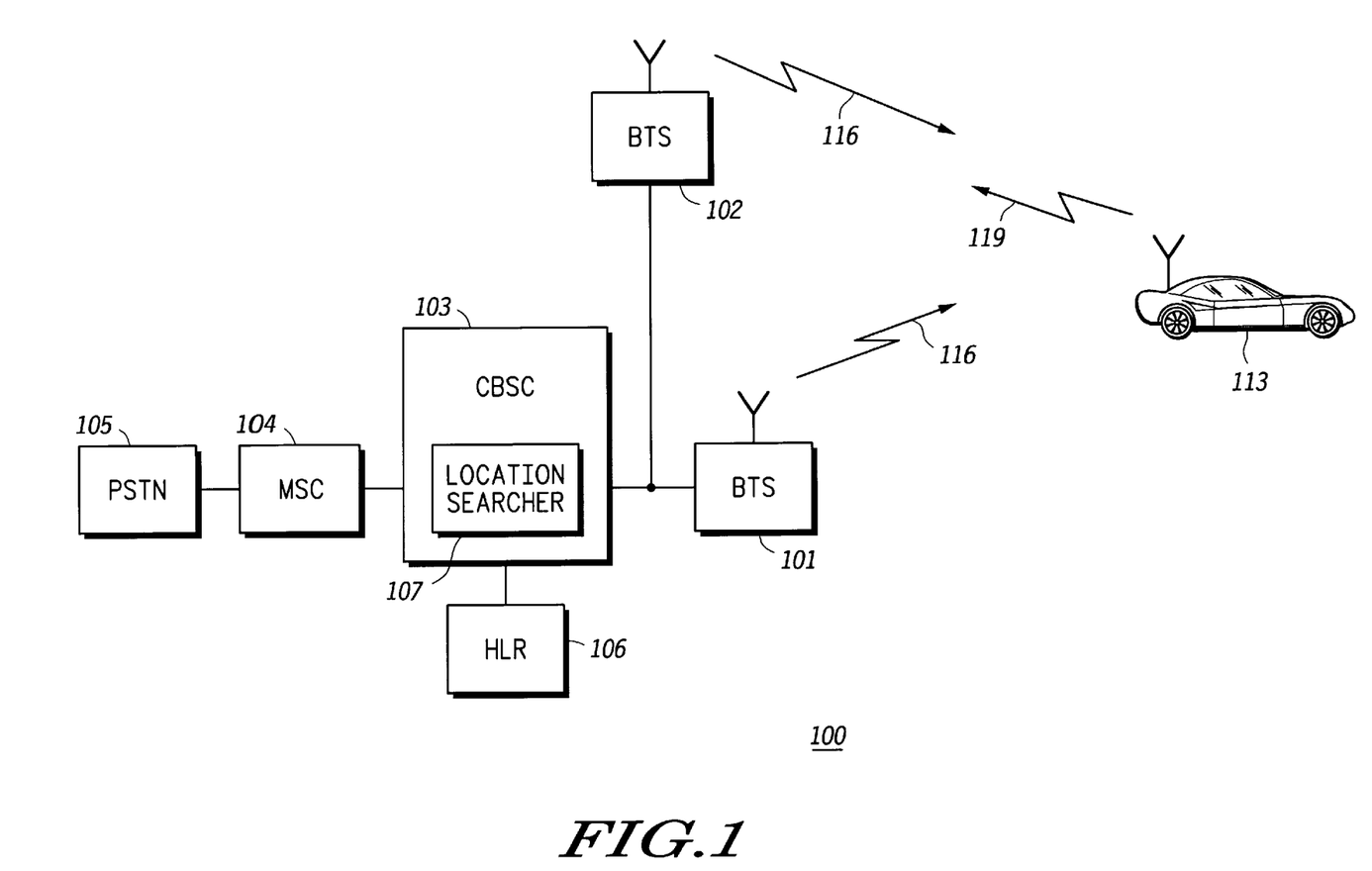
FIG. 1 is a block diagram of a communication system in accordance with the preferred embodiment of the present invention.

Turning now to the drawings, where like numerals designate like components, FIG. 1 is a block diagram of communication system 100 in accordance with the preferred embodiment of the present invention. In the preferred embodiment of the present invention, communication system 100 utilizes a Code Division Multiple Access (CDMA) system protocol as described in Cellular System Remote unit-Base Station Compatibility Standard of the Electronic Industry Association/Telecommunications Industry Association Interim Standard 95A (TIA/EIA/IS-95C). (EIA/TIA can be contacted at 2001 Pennsylvania Ave. NW Washington D.C. 20006). However, in alternate embodiments communication system 100 may utilize other digital cellular communication system protocols such as. but not limited to, the next generation CDMA architecture as described in the UMTS Wideband cdma SMG2 UMTS Physical Layer Expert Group Tdoc SMG2 UMTS-L1 221/98 (UMTS 221/98), the next generation CDMA architecture as described in the cdma2000 International Telecommunication Union-Radiocommunication (ITU-R) Radio Transmission Technology (RTT) Candidate Submission document, or the next generation Global System for Mobile Communications (GSM) protocol, the CDMA system protocol as described in "Personal Station-Base Station Compatibility Requirements for 1.8 to 2.0 GHz Code Division Multiple Access (CDMA) Personal Communication Systems" (American National Standards Institute (ANSI) J-STD-008), or the European Telecommunications Standards Institute (ETSI) Wideband CDMA (W-CDMA) protocol.

Communication system 100 includes a number of network elements such as base station 101, remote unit 113, Centralized Base Station Controller (CBSC) 103, and Mobile Switching Center (MSC) 104. In the preferred embodiment of the present invention, all network elements are available from Motorola, Inc. (Motorola Inc. is located at 1301 East Algonquin Road, Schaumburg, Ill. 60196). It is contemplated that network elements within communication system 100 are configured in well known manners with processors, memories, instruction sets, and the like, which function in any suitable manner to perform the function set forth herein.

As shown, remote unit 113 is communicating with base station 101 and 102 via uplink communication signals 119 and base station 101 is communicating with remote unit 113 via downlink communication signals 116. In the preferred embodiment of the present invention, base station 101 is suitably coupled to CBSC 103, and CBSC is suitably coupled to MSC 104, which is in turn coupled to Public Switched Telephone Network (PSTN) 105.

Operation of communication system 100 in accordance with the preferred embodiment of the present invention occurs as follows: To initiate a location request, a command is originated at a regional entity such as MSC 104, an operations center (not shown), or perhaps within a connected network such as PSTN 105. The location request, which includes identification information on the remote unit that is to be located enters Home Location Register (HLR) 106 where it is processed to determine the currently serving base station. The location request is passed from HLR 106 to the base station providing remote unit 113 with a reference pilot (e.g., base station 101) where base station 101 calculates a location of remote unit 113 using a first location technique. In the preferred embodiment of the present invention the first location technique is a channel modem's finger offsets fused with the known BTS. In other words, the first location technique is a single-site estimation of a PN offset for the remote unit ($PN_{primary\_site}$), however in an alternate embodiments of the present invention, the initial PN offset is taken from a prompt ray/TOA search result.

Location information is then forwarded by base station 101, along with its base station identification, to locating equipment such as location searcher 107 of CBSC 103. Location searcher 107 then passes a second location request to the serving base station and those base stations neighboring the serving base station (neighbor base stations). In an alternate embodiment of the present invention, a second location request is not made. Instead all neighboring base stations simply perform the second location request automatically when the first location request is made (and upon receipt of preliminary serving site TOA estimate from the serving site to assist with windowing).

Sent with the second location request is the calculated first location ($PN_{primary\_site}$) made by base station 101, along with an identity of the base station that made the first location estimate. The neighboring base stations then calculate a limited "search window" unique to each base station to search when locating remote unit 113. More particularly, a search range is calculated by all base stations performing location. The search range is bounded by an initial Pseudo-Noise (PN) offset ($PN_{initial}$) and a final PN offset ($PN_{final}$), and is based on the first location, and the identity of the base station that made the first location estimate. All base stations adjust their search window to look within the range between an initial ($PN_{initial}$) and final ($PN_{final}$) offsets when locating remote unit 113. All base stations then perform a second location of remote unit 113 utilizing a second location technique. In the preferred embodiment of the present invention the second location technique is a TDOA or multi-TOA data fusion technique, however other location techniques may be utilized as well.

As mentioned above, because all base stations limit their search window when performing TOA estimation (the results of which are necessary for multi-TDOA or multi-TOA data fusion location techniques), a highly accurate location method can be performed without requiring the intensive processing of prior-art TOA or TDOA methods of location. More particularly, this technique significantly reduces the 'cold search' range over which remote base site's location finding algorithms must perform asic/mips-intensive algorithms. The 'cold search' range, if unconstrained, extends beyond the typical range of communication channels. Furthermore, sensitivity requirements are greater for the location searcher than communications modems since they must seek and acquire signals below sensitivities of communications modems. Although the known recovered signal is provided by the serving site, further despreading gain is required. This further despreading gain implies a greater level of ASIC or DSP processing power, and hence the need to deploy resources over as narrow a window as possible.

Once a search window is identified, determining a timing offset is accomplished by comparing a known sequence (i.e., the demodulated data transmitted by the remote unit, received by the serving station, and re-distributed to the remote BTSs) to the information transmitted by the mobile and received by the remote site. In other words, as described in "CDMA Principles of Spread Spectrum Communication" by Andrew J. Viterbi, Addison-Wesley Publishing Company, 1995 ISBN 0-201-63374-4, which is incorporated by reference herein, known sequence re-modulation produces a signal which is then correlated with the remote site received baseband data to produce timing offsets. The known sequence of data is compared to the information received by remote unit 113 within the search window to determine the timing difference relative to the remote unit's internal reference, and subsequently the propagation delay and hence the distance between the mobile and the remote unit.

Figure 2:
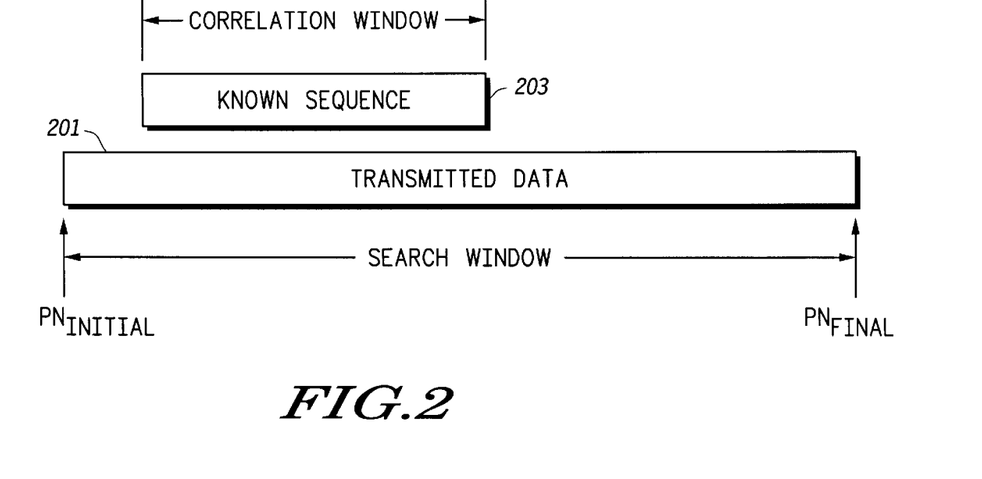
FIG. 2 illustrates the generation of both a search window and a correlation window in accordance with the preferred embodiment of the present invention.

FIG. 2 illustrates the generation of both a search window and a correlation window in accordance with the preferred embodiment of the present invention. As shown, a sequence of transmitted data 201 has a search window of length $PN_{final}-PN_{initial}$. Known sequence 203 is compared to transmitted data, to determine where (in transmitted data 201) known sequence 203 exists. Known sequence 203 has a specific length, referred to as a correlation window. The cross correlation between the re-modulated data and the received data is required to find the timing offset. The energy of the peak of the cross correlation is proportional to the size of the correlation window. DSP and ASIC processing power decrease with decreased window size; however, the energy of the peak also decreases with decreased window size. Because of this, an incorrect location estimate may result from excessively short window size. Therefore, it is beneficial to have a correlation window size that is large enough to detect the energy of the peak cross correlation, yet is small enough to limit DSP and ASIC processing.

With reference to FIG. 2, the correlation window length varies as a function of time offset (or distance that remote unit 113 is from the base station performing the search). In the preferred embodiment of the present invention the correlation window length is calculated as follows:

$$N = N_0 * [t_{arrival}/t_0]^r,$$

where:

N is the correlation window length;

$N_0$ is the reference correlation window length, which in the preferred embodiment of the present invention is a known shortest correlation window length that provides appropriate signal to noise ratio result for cross correlation energy peak at offset $t_0$. This value is a calibrated value that is known a priori, and is determined from the results of drive testing and analysis of environmental factors;

$t_{arrival}$ is the arrival time offset under evaluation, and is bounded by $PN_{initial}$ and $PN_{final}$; and $t_0$ is the offset at which $N_0$ is referenced.

Hence, the correlation window length is short when searching at $PN_{initial}$ (i.e., $t_{arrival}=PN_{initial}$), and is lengthened as the distance searched increases to $PN_{final}$ (i.e., $t_{arrival}=PN_{initial}$). In other words, the correlation window length is shorter when searching at closer distances to the base station, and is lengthened as the distance searched is increased.

As is evident, the correlation window length (or size of known sequence 203) is allowed to vary based on a fundamental geometry of the serving and non-serving base stations. More particularly, the correlation window is allowed to vary based on a distance between the non-serving base station and the distance offset under evaluation.

By allowing the correlation window to vary based on the distance between the non-serving base stations and the distance/offset under evaluation, significant increases in computational throughput as well as reductions in ASIC/DSP processing requirements are obtained.

Figure 3:
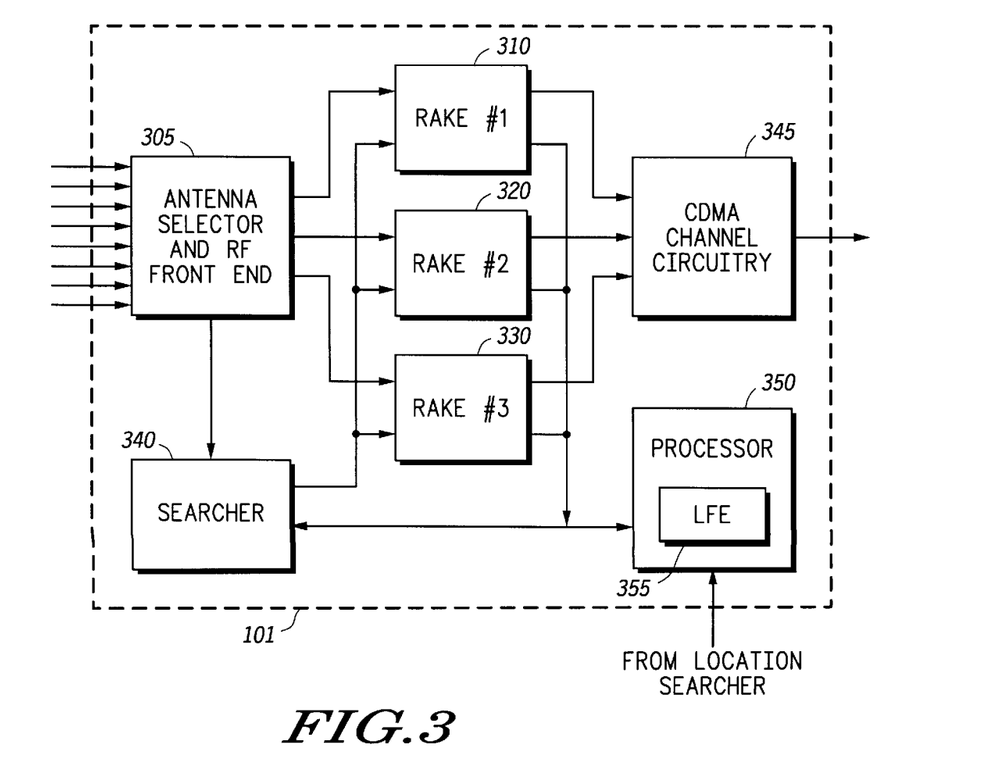
FIG. 3 is a block diagram of a base station of FIG. 1 in accordance with the preferred embodiment of the present invention.

FIG. 3 is a block diagram of a base station of FIG. 1 in accordance with the preferred embodiment of the present invention. Base station 101 has a common RF front end 305 that feeds three independent rake inputs, shown as 310–330.

These rakes (with the assistance of searcher 340) can lock onto three different received rays that are at least a PN chip time apart, which is typical of most rake receivers in CDMA systems. The rake receivers 310–330 are assigned a "window" to search via searcher 340, and with the aid of searcher 340, lock onto a remote unit's transmitted signal. As with the communication modem, the location-specific modem must run long correlation sequences over many offsets. To achieve greater despreading gain, high-gain location searchers also add the frequency offset dimension to stabilize long-duration coherent searches.

Generation of Search Window

Figure 4:
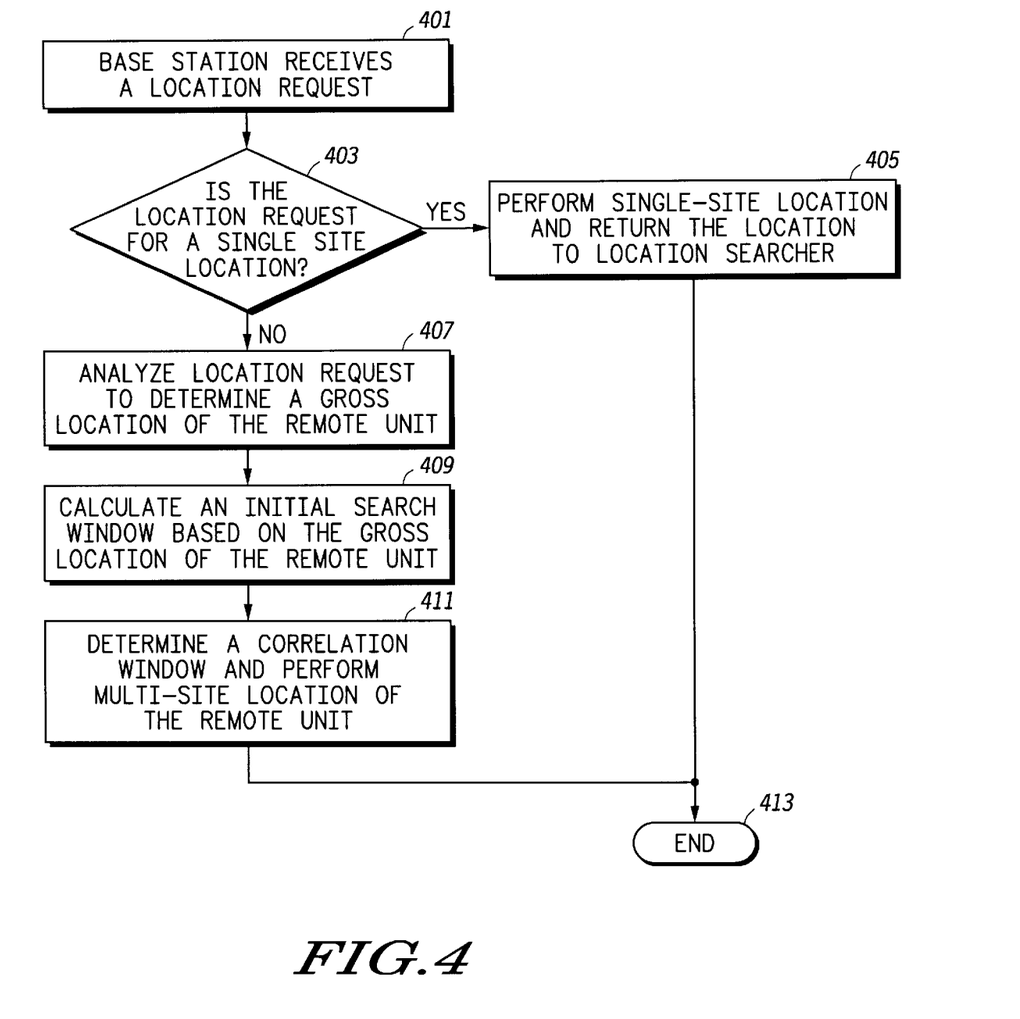
FIG. 4 is a flow chart showing the generation of a search window by the base station of FIG. 1 in accordance with the preferred embodiment of the present invention.

The generation of a search window by base station 101 in accordance with the preferred embodiment of the present invention occurs as illustrated in FIG. 4. At step 401 processor 350 receives a location request from location searcher 107. As discussed above, this location request may be either a request for base station 101 to perform a single site location of remote unit 113 via single-site location techniques, or the location request may be a request for base station 101 to participate in a multi-site location of remote unit 113. Because of this, at step 403 processor 350 determines if the location request is a request for a single-site location of remote unit 113. If at step 403 processor determines that single-site location is desired then the logic flow continues to step 405, otherwise the logic flow continues to step 4307. At step 405 processor 350 utilizes internal Location Finding Equipment (LFE) 355 to perform standard single-site location of remote unit 113, and returns a location ($PN_{primary\_site}$) to location searcher 107, and the logic flow ends at step 413.

At step 407 processor 350 analyzes the location request, and determines a gross location of remote unit 113 ($PN_{primary\_site}$) from the location request. In the preferred embodiment of the present invention the gross location comprises the identity of the base station that performed single-site location, along with the distance that remote unit 113 is from the base station that performed the single-site location. At step 409, processor 350 calculates an initial search window for receivers 310–330 based on the first (single-site) location of remote unit 113, and a base station that made the single-site measurement. At step 411 a correlation window size is determined and base station 101 takes part in the multi-site location of remote unit 113. The observed PN offset for remote unit 113 is reported to location searcher 107, which performs a location based on the multi-site locations of remote unit 113. The logic flow then ends at step 413.

As discussed above, because the initial guess of the search window is approximated, a broad search that uses a complex and resource-consuming search process is avoided. Thus, in accordance with the preferred embodiment of the present invention remote unit 113 can be located via an accurate TDOA technique without the intensive processing required by prior-art TOA or TDOA methods of location.

Figure 5:
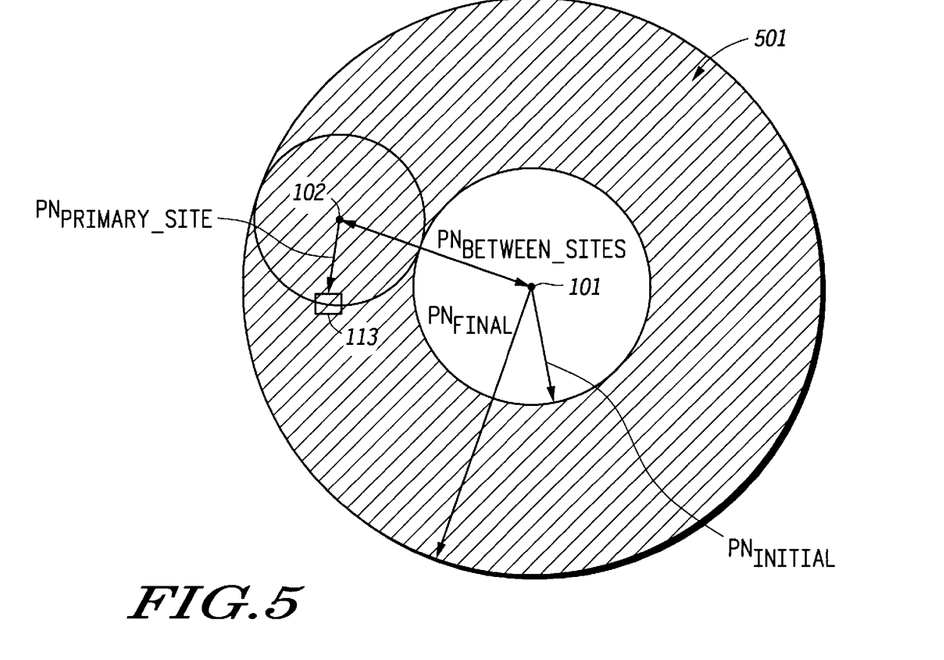
FIG. 5 illustrates the generation of a search window for the Rake receivers of FIG. 2 in accordance with the preferred embodiment of the present invention.

FIG. 5 illustrates the generation of search window 501 for Rake receivers 310–330 in accordance with the preferred embodiment of the present invention. Shown in FIG. 5 are base stations 101 and 102, with base station 101 setting a search window based on a distance ($PN_{between\_sites}$) between base station 101 and 102, and a distance ($PN_{primary\_site}$) that remote unit 113 is from base station 102. As discussed above, $PN_{primary\_site}$ is determined by base station 102 performing a single-site location technique. In the case where $PN_{primary\_site}$ does not exceed $PN_{between\_sites}$, base station 101 should instruct receivers 310–330 to search the area (window) between $PN_{initial}$ and $PN_{final}$, where, $$PN_{initial}=PN_{between\_sites}-PN_{primary\_site}$$

$$PN_{final}=PN_{between\_sites}+PN_{primary\_site}.$$

In the case where $PN_{primaru\_site}$ exceeds $PN_{between\_sites}$, base station 101 should instruct receivers 310–330 to search the area (window) between $PN_{initial}$ and $PN_{final}$, where, $$PN_{initial}=0$$

$$PN_{final}=2*PN_{primary\_site}.$$

Figure 6:
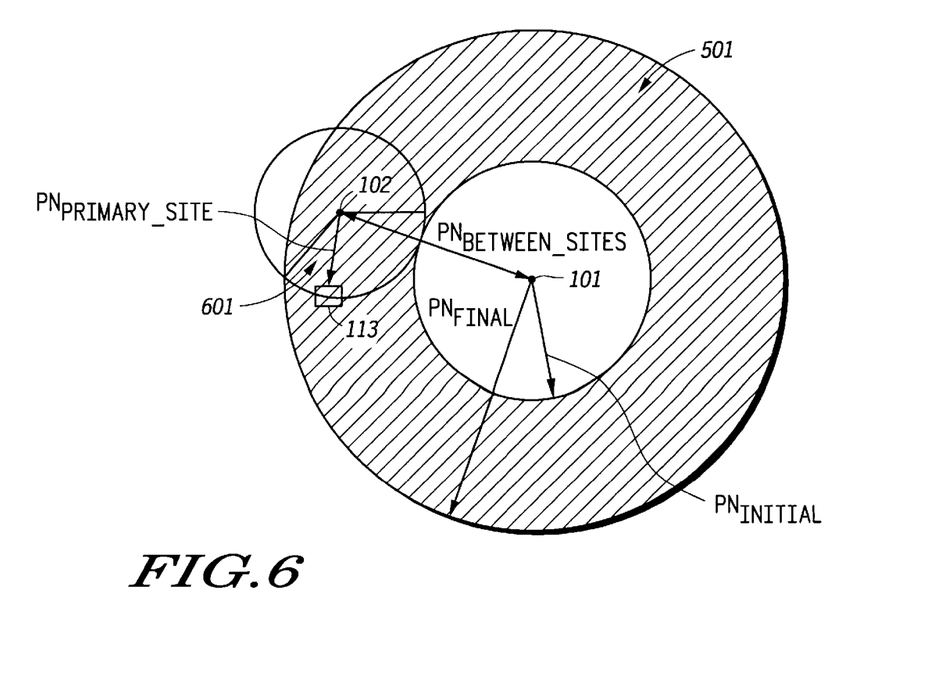
FIG. 6 illustrates the generation of a search window for the Rake receivers of FIG. 2 in accordance with the preferred embodiment of the present invention.

In situations where the service area of the base stations are divided by sectors, the geometry allows for the outer limit of the search window to be further reduced. This situation is illustrated in FIG. 6. If base station 101 knows a base station's bore site azimuth, sector size, and sector 601 within the base station's coverage area that a remote unit was located during single-site timing estimation, the search window can be narrowed so that the search is only performed within a range of offsets that fall within the serving sector coverage area intersected within the vicinity of the serving sector's reported timing offset. This is evident in FIG. 6 where $PN_{final}$ does not extend outside 120° sector 501. By using geometric relationships, it can be shown that for an arbitrary site:

$$PN_{initial}=\text{sqrt}((PN_{between\_sites})^2-2(PN_{primary\_site})(PN_{between\_sites})\cos(\phi-(\alpha/2))+(PN_{primary\_site})^2)$$

$$PN_{final}=\text{sqrt}((PN_{between\_sites})^2-2(PN_{primary\_site})(PN_{between\_sites})\cos(\phi+(\alpha/2))+(PN_{primary\_site})^2).$$

where

φ=Sector boresite (defined as the angle offset clockwise from the line connecting the two base stations under consideration, and represents the boresight of the serving base station's sector).

β=Sector Beam Width (defined as the beam width used for the serving sector. This value will typically be similar to the planned sector Beam Width, but more typically will follow the realized sector Beam Width which is dependent on antenna and environmental factors).

Generation of Correlation Window Length

As described by T. Rappaport in "Wireless Communications," pp. 104, Prentice Hall, N.J., 1996, the path loss (PL) at any particular distance (d) is random and distributed log-normally (normal in dB) about a mean distance-dependent value. More particularly, $$PL(d)=PL(d_0)+10n\log(d/d_0)+X_\sigma,$$

where the use of $d_0$ provides a known (measured) power reference. In other words, the path loss at $d=d_0$ is simply $PL(d_0)+X_\sigma$. The variable d is the distance under evaluation, and n is the coefficient that depends on the specific propagation environment (see table 1). In the preferred embodiment of the present invention, n is the best fit to the free space propagation, environment factors shown in the table, and power control model modifier. $PL(d_0)$ is a reference path loss measured at distance $d_0$, and $X_\sigma$, is a zero-mean Gaussian distributed random variable (measured in dB) with a standard deviation of σ.

TABLE 1

Values of n for various base-station environments

| Environment | n |
| --- | --- |
| Free Space | 2 |
| Urban Area Cellular Radio | 2.7–3.5 |
| Shadowed Urban Area Cellular Radio | 3–5 |
| In-Building Line of Sight | 1.6–1.8 |
| Obstructed In-Building | 4–6 |
| Obstructed In-Factory | 2–3 |

Given the direct relationship between a ray's time of arrival at the serving base station ($t_{arrival}$), expressed in a number of chips, and a distance, expressed in centimeters:

$$d=12207*t_{arrival}.$$

The path loss at the serving base station (PL(d)) can then be re-written as a function of the prompt ray arrival time $t_{arrival}$:

$$PL(t_{arrival})=PL(t_0)+10n\log(t_{arrival}/t_0)+X_\sigma,$$

where $t_0$ is the arrival time of a prompt ray at distance $d_0$.

As discussed above, to evaluate a prompt ray's time of arrival (TOA) at non-serving base stations, a cross-correlation between the received signal and a version of a known signal sent by the remote unit is performed. As a result, correlation peaks at different times represent different paths followed by the signal. The correlation peaks exist over a noise floor created by thermal noise and other interferences. The magnitude of the correlation peaks is an estimation of each signal power, and are directly related to the size of the correlation window (N). In other words the power of the prompt ray ($P_{prompt}$) arriving at offset $t_{arrival}$ is given by, $$P_{prompt}(t_{arrival}) \sim N.$$

In order to keep the correlation peak detectable while maintaining a reduced processing load, the correlation window size (N) is increased as the remote unit's distance from the base station performing the search increases, and vice versa. The change in N at non-serving base stations mirrors the power loss $PL(t_{arrival})$ at the remote base station due to environmental factors (free space path loss, urban/suburban, power control, etc.). For example, if $N_0$ is the correlation window length at the reference distance from the remote base station for $t_0$:

$$\Delta P(t_{arrival})=10\log(N/N_0) \sim PL(t_0)+10n\log(t_{arrival}/t_0)+X_\sigma,$$

from where, $$N/N_0 \sim 10^{(PL(t_0)+X_\sigma)/10}[t_{arrival}/t_0]^n = K*[t_{arrival}/t_0]^n,$$

which leaves, as a valid approximation:

$$N=N_0*[t_{arrival}/t_0]^n.$$

Thus, if $t_0$ represents the time offset at the reference distance (expressed in PN chips), and $N_0$ represents the reference correlation window size used at that reference distance $t_0$, then in order to obtain a detectable correlation peak given a minimal windowing size, N should be varied as a function of the distance/offset under evaluation.

Figure 7:
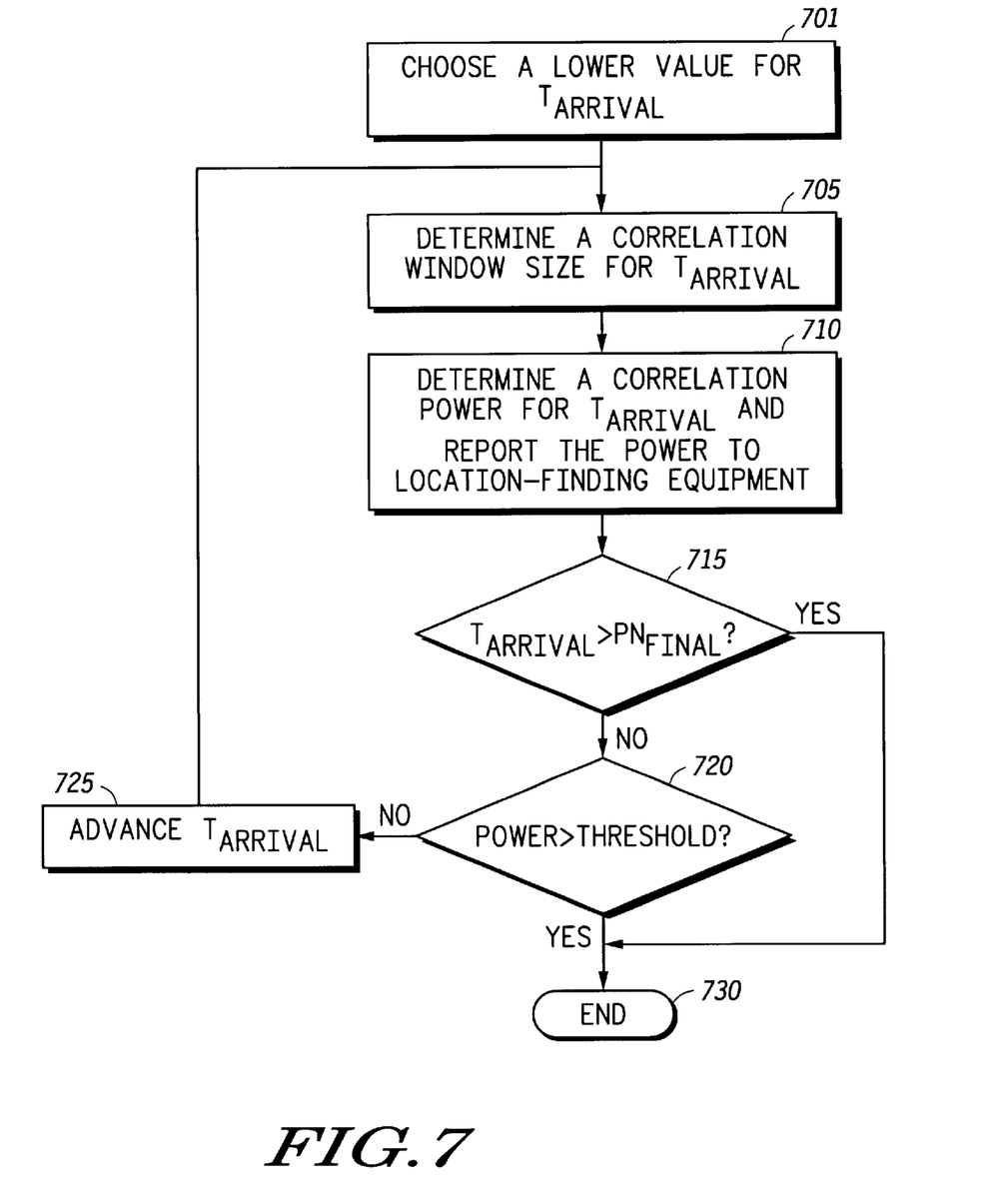
FIG. 7 is a flow chart showing the generation of a correlation window by the base station of FIG. 1 in accordance with the preferred embodiment of the present invention.

FIG. 7 is a flow chart showing the generation of a correlation window by a base station of FIG. 1 in accordance with the preferred embodiment of the present invention. The logic flow begins at step 701 where a lower value for value for $t_{arrival}$ is chosen by processor 350. As discussed above $t_{arrival}$ is bounded on the low side by $PN_{initial}$ and on the high side by $PN_{final}$. Both $PN_{initial}$ and $PN_{final}$ are determined as described above. Therefore at step 701, $t_{arrival}$ is set equal to $PN_{initial}$ (which is based on the first location of the remote unit). Additionally $t_{arrival}$ corresponds to a time offset, or distance, that the remote unit is from the base station. At step 705 processor 350 determines a correlation window size for $t_{arrival}$. In particular the correlation window size is set equal to $N_0*[t_{arrival}/t_0]^n$. At step 710 a correlation power is determined for tarrival by searcher 340 and reported to LFE 355. As discussed above, the correlation power is a cross-correlation between the known sequence and data received by the remote unit. The logic flow then continues to step 715 where it is determined if $t_{arrival} > PN_{final}$. If at step 715, $t_{arrival} = PN_{final}$ then the logic flow ends at step 730, otherwise the logic flow continues to step 720 where it is determined if the correlation power is above a threshold. In particular, at step 720 a determination is made as to if the $t_{arrival}$ has a high confidence of being the offset for the prompt ray. This is done by determining if the correlation power is above a threshold. If, at step 720 it is determined that the correlation power is above the threshold, then the logic flow ends at step 730, otherwise the logic flow continues to step 725. At step 725, $t_{arrival}$ is advanced to the next offset under evaluation and the logic flow returns to step 705.

Although the preferred embodiment described in FIG. 7 "walked" though possible offsets for $t_{arrival}$ in an alternate embodiment of the present invention, all possible offsets for $t_{arrival}$ may be analyzed simultaneously. The alternate embodiment is better performed by implementation on an ASIC, wherein the preferred embodiment is better performed when implementation is in software.

The descriptions of the invention, the specific details, and the drawings mentioned above, are not meant to limit the scope of the present invention. For example, although TOA and TDOA have been utilized in the preferred embodiment of the present invention, one of ordinary skill in the art will recognize that other forms of location (e.g., various forms of propagation delay measurements on prompt rays, power measurements, amplitude differencing for AOA, generic searcher techniques for TOA determination, TDOA fusion techniques etc.) may be utilized without varying from the scope of the present invention. Additionally, although the generation of the search and correlation windows is based on a distance "between" base stations, it is contemplated that an equivalent method for determining distances "between" base stations may be to determine each base station's distance to a fixed point, and use the distances to the fixed point in determining the search and correlation windows. It is the intent of the inventors that various modifications can be made to the present invention without varying from the spirit and scope of the invention, and it is intended that all such modifications come within the scope of the following claims and their equivalents.

What is claimed is:

1. A method for finding a timing offset for a remote unit at a base station within a communication system, the method comprising the steps of:

(a) receiving a location of the remote unit along with a request to find the timing offset between the remote unit and the base station, wherein the location of the remote unit was performed by a second base station;

(b) determining a distance that the remote unit is from the base station based on the first location;

(c) determining a size of a known sequence based on the location of the remote unit, wherein the size of the known sequence varies in length based on the distance that the remote unit is from the base station; and (d) finding a timing offset for the remote unit at the base station by correlating the known sequence to a signal received by the remote, wherein the known sequence has its size as determined in step (c).

2. The method of claim 1 wherein the step of receiving the location of the remote unit comprises the step of receiving a location bounded by a first Pseudo-Noise (PN) offset and a second PN offset.

3. An apparatus for finding a timing offset between a remote unit and a base station, the apparatus comprising:

an input for receiving a location of the remote unit along with a request to find the timing offset between the remote unit and the base station, wherein the location of the remote unit was performed by a second base station;

a processor having the location of the remote unit as an input, determining a distance that the remote unit is from the base station based on the location and outputting a size (N) of a known sequence based on the location of the remote unit, wherein the size (N) of the known sequence varies in length based on the distance that the remote unit is from the base station; and a searcher having the known sequence of length N as an input and outputting the timing offset between the remote unit and the base station, wherein the timing offset is determined by correlating the known sequence to a signal received by the remote.

4. The apparatus of claim 3 wherein the location of the remote unit is a location bounded by a first Pseudo-Noise (PN) offset and a second PN offset.

* * * * *